United States Patent [19]

Hall et al.

[11] Patent Number: 4,694,941
[45] Date of Patent: Sep. 22, 1987

[54] DRIVE HUB FOR TORQUE CONVERTER CLUTCH

[75] Inventors: David A. Hall, Clawson; Kenneth C. Yuergens, Farmington Hills, both of Mich.

[73] Assignee: Borg-Warner Automotive, Inc., Troy, Mich.

[21] Appl. No.: 886,146

[22] Filed: Jul. 16, 1986

[51] Int. Cl.[4] .................................................. F16D 3/12
[52] U.S. Cl. .................................. 192/3.28; 192/70.19
[58] Field of Search ............. 192/106.1, 106.2, 110 S, 192/3.28, 3.29, 3.3, 3.31, 3.32, 3.33, 70.19, 70.18, 70.17, 70.16; 464/68

[56] References Cited

U.S. PATENT DOCUMENTS

| | | | |
|---|---|---|---|
| 2,694,478 | 11/1954 | Zeidler | 192/68 |
| 2,821,867 | 2/1958 | Kelbel | 74/688 |
| 3,138,039 | 6/1964 | Zeidler et al. | 192/106.2 |
| 3,777,863 | 12/1973 | Chana | 192/3.33 |
| 4,138,003 | 2/1979 | Malloy | 192/3.29 |
| 4,167,993 | 9/1979 | Vukovich et al. | 192/3.3 |
| 4,188,805 | 2/1980 | Fall et al. | 464/64 |
| 4,304,107 | 12/1981 | Fall et al. | 464/64 |
| 4,333,552 | 6/1982 | LaMarche | 192/3.29 |
| 4,347,717 | 9/1982 | LaMarche | 464/64 |
| 4,555,009 | 11/1985 | Habel et al. | 192/106.1 X |
| 4,576,260 | 3/1986 | Koshimo | 192/3.31 |

FOREIGN PATENT DOCUMENTS 2045367 10/1980 United Kingdom ............... 192/3.28

Primary Examiner—George H. Krizmanich
Attorney, Agent, or Firm—James A. Geppert

[57] ABSTRACT

A drive hub for a torque converter lock-up clutch and damper assembly wherein a one-piece hub provides radial location for the driving and driven members and a pressure seal to provide the requisite pressure differential across the clutch pressure plate for application of the clutch during torque converter use.

4 Claims, 5 Drawing Figures

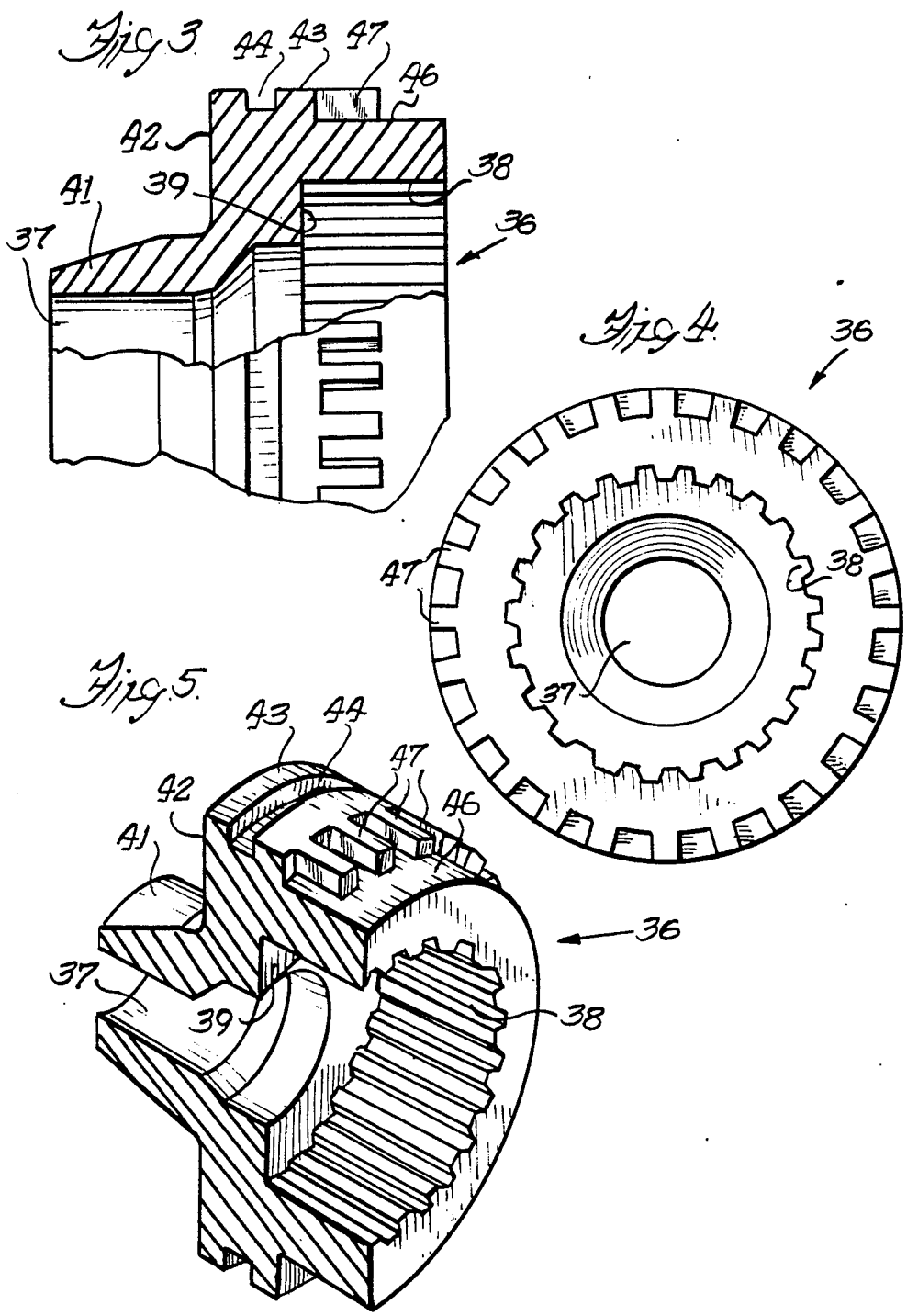

DRIVE HUB FOR TORQUE CONVERTER CLUTCH

BACKGROUND OF THE INVENTION

The present invention relates to a novel drive hub used in a lock-up clutch assembly for a torque converter. In some presently known torque converters, the torque converter clutch assembly is located radially in the torque converter by the turbine hub and turbine shaft operatively connected to the transmission input shaft for the vehicle. The driven portion of the clutch is located on the turbine hub while the larger mass, including the pressure plate, etc., is located by a spacer which is, in turn, located on the turbine shaft. Manufacturing clearances and tolerances on these parts result in generally poor location of the clutch assembly, including any damper structure, in the radial direction, contributing to unacceptable vibration characteristics and poor durablility. The present invention overcomes these problems in the use of a novel one-piece hub for the clutch assembly.

SUMMARY OF THE INVENTION

The present invention relates to a one-piece clutch hub which replaces the hub member and separate spacer arrangement presently utilized in some designs of torque converter lock-up clutch assemblies. This unitary hub provides for radial location of all clutch and damper components relative to a single component within the clutch assembly. This component is, in turn, radially located by a single component of the torque converter, thus reducing the number of components whose manufacturing tolerances and operating clearances contribute to mis-location in the assembly. Also, the ability to maintain static and dynamic balance is substantially improved since the location of components is more controlled.

The present invention further relates to a one-piece drive hub component for a torque converter lock-up clutch assembly wherein the minimization of the number of components in the clutch assembly improves the "stack" of component tolerances, reducing overall variation and allowing the use of smaller nominal clearances. This hub also improves component balance characteristics and allows a performance improvement by making space previously required for clearances available for functioning components.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 3 is an enlarged view of a portion of the drive hub, part in elevation and part in cross section.

FIG. 4 is an enlarged and elevational view of the hub taken from the right-hand end of FIG. 3.

FIG. 5 is an enlarged cross sectional view of the hub shown in perspective.

DESCRIPTION OF THE PREFERRED EMBODIMENT

Figure 1:
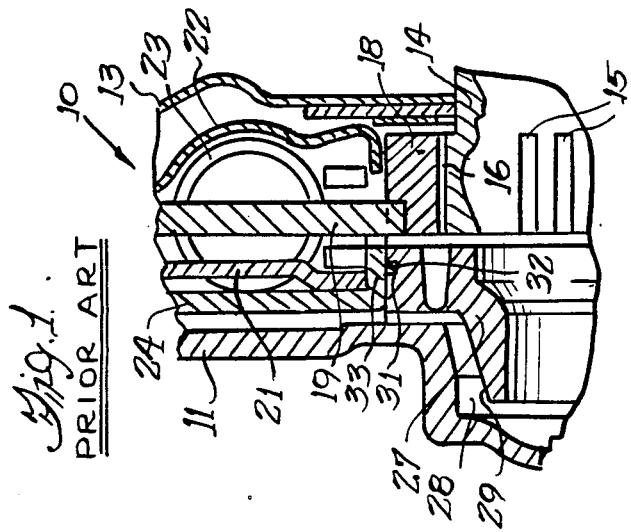
FIG. 1 is a partial cross sectional view through the hub portion of a lock-up clutch and damper assembly for a present torque converter.

Referring more particularly to the disclosure in the drawings wherein is shown an illustrative embodiment of the present invention, FIG. 1 discloses a conventional hub and spacer assembly utilized for some designs of a torque converter lock-up clutch 10 wherein the torque converter housing 11 is operatively connected to the output shaft of a vehicle engine (not shown) and directly connected to an impeller therefor, and a turbine 13 mounted on a turbine hub 14 has internal splines 15 receiving the splined end of a transmission input shaft (not shown).

Figure 2:
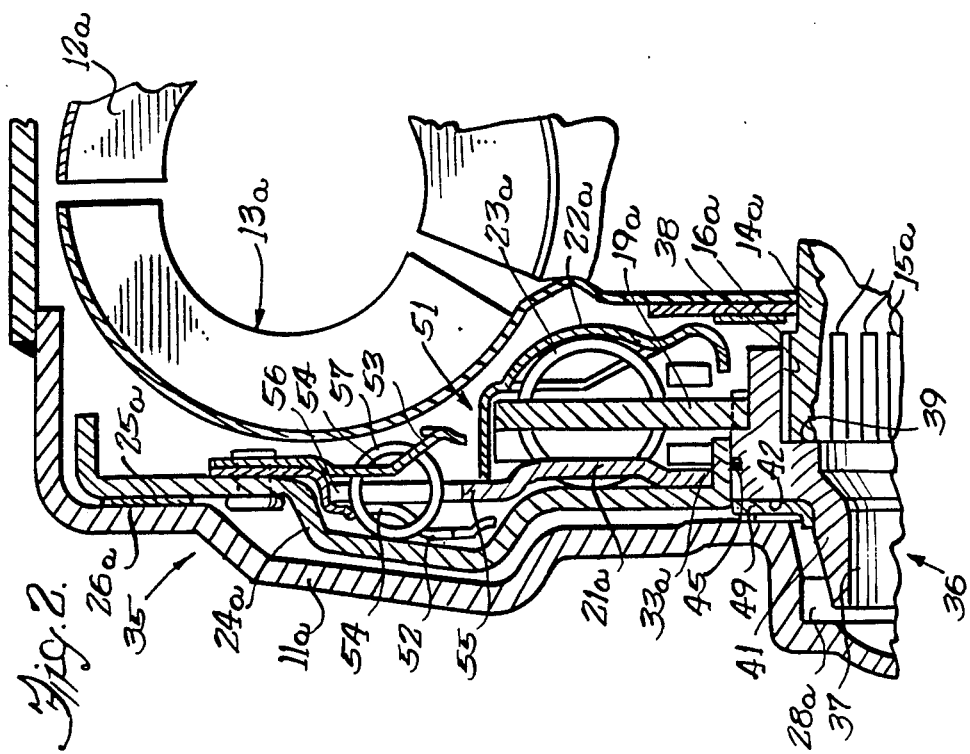
FIG. 2 is a partial cross sectional view of the novel drive hub of the present invention in a torque converter lock-up clutch.

External splines 16 on the turbine hub mesh with internal splines of a clutch hub 18 carrying a hub plate 19 for a clutch damper assembly. Housing plates 21,22 encompass the hub plate 19 and compression springs 23; the plates 21,22 being operatively connected to a piston plate 24 having a friction face operatively engaging a friction surface on the torque converter housing as seen in FIG. 2. A generally annular spacer 27 is located between the housing 11 and the clutch hub 18 and has an inner extension 29 received in a recess 28 of the housing 11. Also, the spacer has an annular groove 31 for a suitable seal ring 32 engaged by an inner guide flange 33 on the piston plate 24 to guide the axial movement of the piston plate and provide the requisite pressure differential on the opposite sides of the pressure plate during lock-up of the clutch.

Considering FIG. 2, a torque converter and damper assembly 35 is shown with like parts having the same numerals with the addition of a script a. The torque converter housing 11a is connected to the impeller 12a and has an annular friction surface 26a facing the friction ring 25a on the piston plate 24a. The turbine 13a is mounted on a turbine hub 14a having internal splines 15a for the transmission input shaft and external splines 16a. A one-piece drive hub 36 has a central passage 37 provided with an internally splined counterbore 38 receiving the splines 16a on the turbine hub 14a; the counterbore defining a shoulder 39 abutting the end of the turbine hub. The hub includes a forward reduced annular extension 41 defining a shoulder 42 and received in a recess 28a of the torque converter housing 11a.

In the external surface 43 of the hub is formed an annular groove 44 receiving a resilient sealing ring 45 for engagement with the inner guide flange 33a of the piston plate 24a, and a reduced portion 46 of surface 43 has external splines 47 to mesh with the inner splined periphery of a clutch plate 19a for the damper assembly 51. An annular bearing assembly 49 is located between the shoulder 42 of the hub 36 and the torque converter housing 11a.

The damper assembly 51 shown in FIG. 2 is a two-stage extended travel damper such as described in U.S. Pat. No. 4,347,717 and includes a pair of outer housing plates 52,53 secured to the piston plate 24a and having inwardly offset drive straps 54,54, a hub plate 55 having arms 56 separating damper springs 57, the inner extension of the hub plate forming one housing plate 21a of an inner housing portion for damper springs 23a; the plates 21a,22a encompassing the springs and inner hub plate 19a. Reference is made to the above cited patent for the remainder of the damper structure and its function. Although shown in conjunction with a two-stage damper, this hub may be used with a single stage damper such as shown in U.S. Pat. No. 4,188,806.

As seen in FIG. 2, the one-piece drive hub 36 provides a single component to reduce the "stack" of component tolerances and allow the use of smaller nominal clearances. This hub provides for improved radial location of the piston plate 24a, clutch hub plate 19a and housing plates 21a and 22a. Also, this clutch hub 36 is radially located on the turbine hub 14a. A further advantage of this hub is that it can be easily formed from powdered metal without complicated coring or molds in view of the configuration of the hub, the splines and passages.

We claim:

1. A one-piece drive hub and spacer for a lock-up clutch in a torque converter, comprising an elongated hub barrel having a counterbored internal passage defining a shoulder acting to engage the end of a turbine hub of the torque converter having external splines; a plurality of internal splines in the counterbored portion adapted to receive the externally splined turbine hub, a cylindrical external surface receiving the inner periphery of a clutch piston plate, sealing means in said external surface engaging the plate periphery, and external splines formed adjacent one end of said surface adapted to receive a hub plate for said lock-up clutch.

2. A one-piece drive hub and spacer as set forth in claim 1, wherein said barrel has a shoulder at one end of said cylindrical surface adapted to engage bearing means in the torque converter housing.

3. A one-piece drive hub and spacer as set forth in claim 1, in which said sealing means includes a resilient O-ring received in an annular groove in said cylindrical surface.

4. A one-piece drive hub and spacer as set forth in claim 1, including a reduced end on said hub opposite said counterbored passage piloting the hub in the torque converter.

* * * * *